Figure 1:
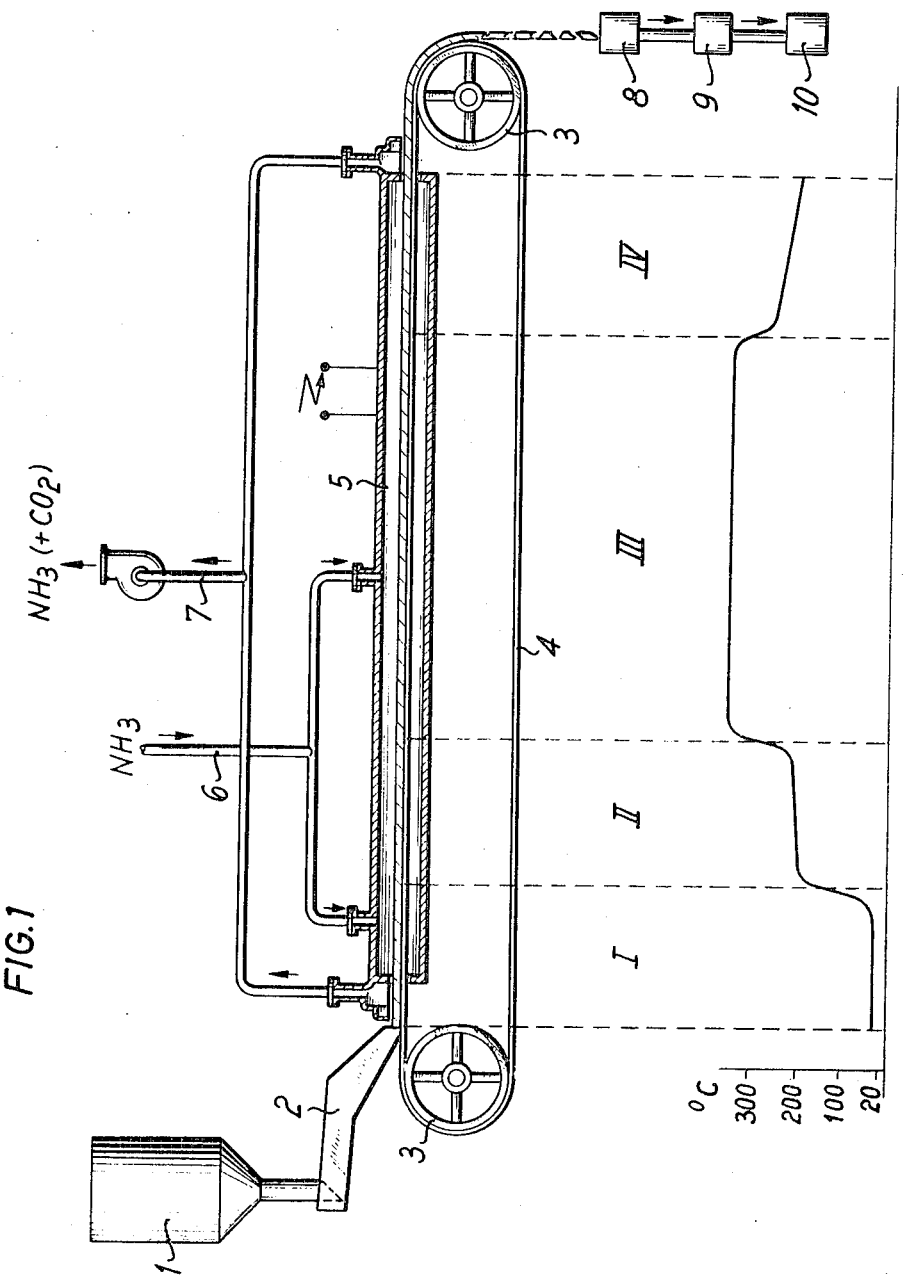

United States Patent
Heymer et al.

[15] 3,653,821
[45] Apr. 4, 1972

[54] PROCESS FOR THE MANUFACTURE OF AMMONIUM POLYPHOSPHATES

[72] Inventors: Gero Heymer; Wilfried Gerhardt, both of Knapsack near Cologne; Heinz Harnisch, Lovenich near Cologne, all of Germany

[73] Assignees: Knapsack Aktiengesellschaft, Knapsack near Cologne; Benckiser-Knapsack GmbH, Ludwigshafen/Rhine, Germany

[22] Filed: Apr. 9, 1969

[21] Appl. No.: 814,635

[30] Foreign Application Priority Data

Apr. 11, 1968 Germany................P 17 67 205.8

[52] U.S. Cl.................................23/106, 71/34
[51] Int. Cl. .....................................C01b 25/28
[58] Field of Search...........................23/106, 107; 71/34, 43

[56] References Cited

UNITED STATES PATENTS 3,397,035 8/1968 Shen et al. ...............................23/106
3,419,349 12/1968 Rohlfs et al..............................23/107
3,495,937 2/1970 Shen..........................................23/106

*Primary Examiner*—Oscar R. Vertiz
*Assistant Examiner*—Charles B. Rodman
*Attorney*—Connolly and Hutz

[57] ABSTRACT

Production of ammonium polyphosphates of the general formula $(NH_4PO_3)_n$, in which $n$ is a number between 10 and 400, from ammonium orthophosphate, phosphorus pentoxide and, if desired, urea in contact with gaseous ammonia. A feed mixture produced from ammonium orthophosphate, phosphorus pentoxide and urea in the ratio of 1 mol ammonium orthophosphate: $(1-x/2$ mol $P_4O_{10}+x$ mol urea), wherein $x$ is a number between 0 and 0.5, is subjected to annealing treatment at temperatures between 200° and 340° C., for a minimum of 10 minutes and a maximum of 60 minutes, in contact with ammonia. Mixtures in which $x$ is smaller than 0.25 are pretreated at temperatures lower than 190° C. for a period of time between 5 and 10 minutes, in an ammonia atmosphere.

8 Claims, 2 Drawing Figures

PROCESS FOR THE MANUFACTURE OF AMMONIUM POLYPHOSPHATES

The present invention relates to a process for the manufacture of chain ammonium polyphosphates of the general formula $(NH_4PO_3)_n$, in which $n$ is a number between 10 and 400, from ammonium orthophosphate, phosphorus pentoxide and, if desired, urea, in contact with gaseous ammonia.

It has long been known that ammonium polyphosphates — which are briefly termed APP hereinafter — can be produced by simple neutralization of polyphosphoric acid by means of gaseous ammonia. While this process has already been tried commercially, the fact remains that only short chain products are obtained which are very hygroscopic and very water-soluble. They are chiefly used in agriculture and forestry.

Substantially no technical use has been made of APP until a few years ago, although the polyphosphates of cations other than ammonium, more particularly those of sodium and potassium ions, have gained considerable technical interest. The reason for this firstly is the hygroscopicity, which substantially handicaps the use of short chain products, and secondly the non-availability of a commercial process for the production of well crystallized, non-hygroscopic medium or long chain APP.

It is known that condensed phosphates are produced almost exclusively by linking the $PO_4$-groups of orthophosphates together, with thermal dehydration. To this end, it is necessary to work at temperatures between about 200° and 800° C., depending on the product which is desired to be produced. The use of alkali metal or alkaline earth metal salts at such high temperatures entails no difficulties bearing in mind that corresponding cation oxides are scarcely volatile at these temperatures. In the case of ammonium salts, however, it is found that the decomposition pressure of the ammonia above these salts increases as the dehydration temperature increases with the result that water of constitution is split off and the chain lengthened. At the same time, however, volatile ammonia escapes from the product and cross-linked materials, i.e. so-called ultraphosphates which have undesirable properties, are obtained.

This difficulty is obviated in the process described in German Pat. No. 1,216,856, wherein the constitution water of orthophosphates is removed by reaction with urea at temperatures between 110° and 350° C., rather than by thermal dehydration. While this enables the chain to be condensed at much lower temperatures without escape of ammonia from the product, the fact remains that considerable disadvantages are encountered in carrying out this process under commercial conditions, which imply freeing the reaction material which is soft at the reaction temperature, from large quantities of gases ($CO_2$ and $NH_3$) that are liberated during the reaction. The linking together of two $PO_4$-groups so as to obtain a P–O–P bond in the chain dictates the use of one molecule urea, which decomposes into $CO_2 + NH_3$. One mol $NH_3$ appears as the cation in APP, which means that the condensation of 1 mol orthophosphate to long chain material is accompanied by the evolution of 2 mols gas. This corresponds to a gas evolution rate of nearly 1 cubic meter per kg. APP, for the mean reaction temperature. The large quantities of escaping gas considerably increase the volume of the soft reaction mass. This means considerable difficulties with respect to apparatus, poor space/time yields and considerably higher process costs. In addition thereto, the large quantities of escaping $NH_3$ and $CO_2$ undergo reaction in the colder parts of the apparatus with the resultant formation of solid compounds, which give rise to incrustation and cloggings.

It has also been suggested (cf. Dutch Pat. No. 6,409,323) that ammonizing agents be used in combination with condensing agents, for example urea, ammonium carbamate, biuret, sulfamides, sulfamic acid, guanyl urea and 1,3-diamino urea. In other words, this process produces effects which are as disadvantageous as those produced in the process reported hereinabove. In order to minimize the difficulties encountered with respect to apparatus in the removal of the large gas quantities, the above process is chiefly carried out in two steps. The first step comprises producing short chain APP by reaction of ammonium orthophosphates, short chain polyphosphoric acids or similar material with urea and the second step comprises mixing the APP again with urea and transforming it then into a medium or long chain product. While the process is technically simpler to achieve in this manner, the fact remains that its economy is substantially not improved thereby.

A further process for the production of APP has been described in Belgian Pat. No. 677,866, wherein APP is produced by heating a mixture consisting of a phosphate, a condensing agent and an ammonia compound to temperatures between 100° and 350° C., under controlled ammonia and steam pressures. In order to produce material with a predetermined solubility in water, it is necessary to produce the APP in an atmosphere with quite specific ammonia and steam partial pressure values, which are a function of the temperature. While quite a number of applicable ammonizing and condensing agents have been listed therein, the fact remains that nearly all of these agents give rise to vigorous evolution of gas, for example $CO_2$ from urea, and that the quantity of gas liberated varies continuously, during the reaction. Needless to say therefore it is a technically very difficult and costly procedure uniformly to maintain the ammonia and steam partial pressure values needed, above the reaction product.

The present invention now provides a process for the manufacture of chain ammonium polyphosphates of the general formula $(NH_4PO_3)_n$, in which $n$ is a number between 10 and 400, from ammonium orthophosphate, phosphorus pentoxide and, if desired, urea in contact with gaseous ammonia, which unexpectedly enables the difficulties reported above to be obviated and wherein a feed mixture produced from ammonium orthophosphate, phosphorus pentoxide and urea in the ratio of 1 mol ammonium orthophosphate : $(1 - x/2 \text{ mol } P_4O_{10} + x \text{ mol urea})$, in which $x$ is a number between 0 and 0.5, preferably between 0.05 and 0.25, is subjected to annealing treatment at temperatures between 200° and 340° C., for a minimum of 10 minutes and a maximum of 60 minutes, in contact with ammonia, mixtures in which $x$ is smaller than 0.25 being pretreated at temperatures lower than 190° C., for a period of time between 5 and 10 minutes, in an ammonia atmosphere.

During the annealing step, the ammonia partial pressure should preferably be maintained at a value of at least 0.6 atmosphere for temperatures between 200° and 300° C., and at a value of at least 0.9 atmosphere for temperatures above 300° C.

In the case of mixtures, wherein $x$ is smaller than 0.25, which dictate a 5 to 10 min. pretreatment at temperatures lower than 190° C., in an ammonia atmosphere, prior to the annealing step, the ammonia partial pressure should preferably be maintained at a minimum value of 0.4 atmosphere, during that period.

The feed mixture is conveniently heated by conveying it through an ammonia-fed tunnel kiln wherein the temperature gradient is selected so as to be consistent with the conditions desired to prevail therein.

In those cases in which the reaction is carried out in an ammonium-fed rotary furnace which also has a temperature gradient selected so as to be consistent with the conditions desired to prevail therein, it is advantageous to recycle a portion of ground final product to the furnace. The feed material and recycle material should preferably be used in a quantitative ratio of about 1:1, and the feed material should preferably contain between 0.1 and 0.15 mol urea, per mol orthophosphate.

The present process distinguishes favorably over the prior art methods and enables pure medium or long chain APP to be obtained, that is free from impurities, such as those which are occasioned by short chain polyphosphates or compounds of the type

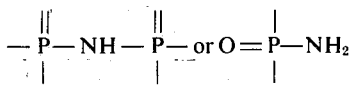

or cross-linked products.

The removal of large quantities of gas from the soft reaction mass is equally unnecessary. In other words, it is possible to use substantially simpler apparatus than those which are employed in prior art methods. Still further, all devices normally needed for the work-up of large quantities of gaseous ammonia and carbon dioxide, or for the removal of their secondary products, can be omitted in the present process.

A further advantage of the present process resides in the fact that it can be carried out as a one step operation without the need to isolate intermediary products. The reaction occurs without substantial increase in volume as the powder mixture sinters and partially fuses together on being heated to temperatures higher than 190° C. Water set free on condensing the orthophosphate is immediately absorbed within the tightly packed powdery feed mixture by $P_4O_{10}$ which itself is transformed into a long chain polyphosphate ion, given correct selection of the mixing ratio. In other words, no water need be removed from the mixture at high temperatures. The mixture also contains ammonium ions which derive from diammonium phosphate. The possible lack of ammonium ions in the mixture can be compensated by the absorption of ammonia from the gas phase. The feed mixture should preferably be used in combination with minor amounts of urea. Prior art methods primarily use the urea for the purpose of binding water formed during the reaction. In the present process, however, the urea is intended by $CO_2$-evolution to cause some slight break-up of the product during the principal reaction with the resultant formation of a hard, yet porous product which is easy to crush and grind. As can be inferred from this, it is advisable not to use too large quantities of urea which would too strongly increase the product volume and again result in difficulties.

The following reaction equation $3\ P_4O_{10}+8(NH_4)_2HPO_4+2\ CO(NH_2)_2 \rightarrow 20/n\ (NH_3PO_3)_n+2\ CO_2$ in which $n$ is the average chain length of the APP-molecule, occurs with the use of 0.25 mol urea per mol orthophosphate. The quantity of gas evolved is only about 5 percent of the quantity of gas evolved by reaction of urea phosphate under conventional conditions. An even lower volume increase of the reaction mass is very desirable for APP-production on an endless steel tape in a flat tunnel kiln. In this event, it has been found particularly advantageous to use mixtures having only 0.06 mol urea, per mol orthophosphate, therein. Optimum results in a rotary furnace are obtained with the use of mixtures containing between 0.1 and 0.15 mol urea, per mol orthophosphate, and with the use of recycle material in a ratio of 1:1. In those cases in which the mixture contains less than 0.25 mol urea per mol orthophosphate, the balance ammonia is absorbed from the gas phase. In this event, it is necessary to provide for ammonia absorption by $P_4O_{10}$ before the principal reaction temperature (190° to 200° C.) is reached.

Very long annealing periods are needed for the production of a final product with a $NH_4$:P-ratio of about 1, given that the principal reaction occurs prior to the ammonia absorption. In the case of very tight material, it may even be impossible to reach the above ratio, and cross-linked material, which fails to have the form of a chain, is obtained.

The following equation $3.75\ P_4O_{10}+8(NH_4)_2HPO_4+0.5\ CO(NH_2)_2\cdot 6NH_3 \rightarrow 23/n(NH_4PO_3)_n+0.5\ CO_2$ illustrates the above tunnel kiln production.

A still further advantage of the present process resides in the fact that the final temperature selected enables the chain length of the product to be predetermined. The principal reaction occurs between 190° and 200° C. By heating the product further in an ammonia atmosphere to temperatures between 200° and 340° C, it is possible to produce material with a chain length $n$ between 10 and 400, which is a function of the temperature selected and which increases as the temperatures increase. The possibility of predetermining the chain length is of interest because the APP-portion which is water-soluble at room temperature decreases as the chain length increases.

For example, products having the following chain lengths $n$ can be produced at the following temperatures:

$n=$ 10 to 50 at 200° to 260°C
$n=$ 50 to 100 at 260° to 290°C
$n=$ 100 to 200 at 290° to 320°C
$n=$ 200 to 300 at 320° to 330°C and
$n=$ 300 to 400 at 330° to 340°C.

The process of the present invention thus enables the water-soluble portion of the final product to be predetermined. As the desirable water-soluble portion varies with the use the material is put to, it is readily possible to use the same apparatus for the production of products having different properties, for various applications.

A final advantage offered by the present invention is the short reaction time. The final product is obtained as rapidly as 10 minutes after the preselected temperatures has been reached. This enables good space/time yields to be produced and the manufacturing process to be carried out continuously.

An apparatus for use in carrying out the process of the present invention is shown diagrammatically in FIG. 1 of the accompanying drawings. As shown therein, powder mixture coming from reservoir bunker 1 is conveyed by means of conveyor 2 to steel tape 4 which is arranged to be driven by guide rollers 3 so as to travel continuously through tunnel kiln 5. The kiln comprises a plurality of sections arranged for separate thermal control, and is preferably provided with an electrical heating means. The temperatures prevailing in zones I and II should be selected so as to be fairly consistent with the values indicated in FIG. 1, whereas the temperatures desired to prevail in zone III are a function of the APP-chain length desired to be produced. In zone IV, which is not heated, the product is allowed gradually to cool before it leaves the ammonia atmosphere prevailing inside the kiln. Some slight stream of ammonia is introduced at 6 into the tunnel center portion in order to maintain the $NH_3$-atmosphere, and $CO_2$ which may be found to have been evolved, is withdrawn through outlet valves disposed near the furnace ends. The two gases together with secondary air are removed by suction, through line 7 and an exhauster. Further ammonia should be conveniently fed to zone I in those cases in which the composition of the mixture makes it necessary for it to absorb some further $NH_3$, for practically quantitative transformation into APP. The principal reaction then occurs in zone II and the annealing step, which is necessary to obtain the desirable chain length, is carried out in zone III. A brittle and coherent final product leaves the kiln. It must merely be crushed at 8, ground at 9 and packed at 10.

Figure 2:
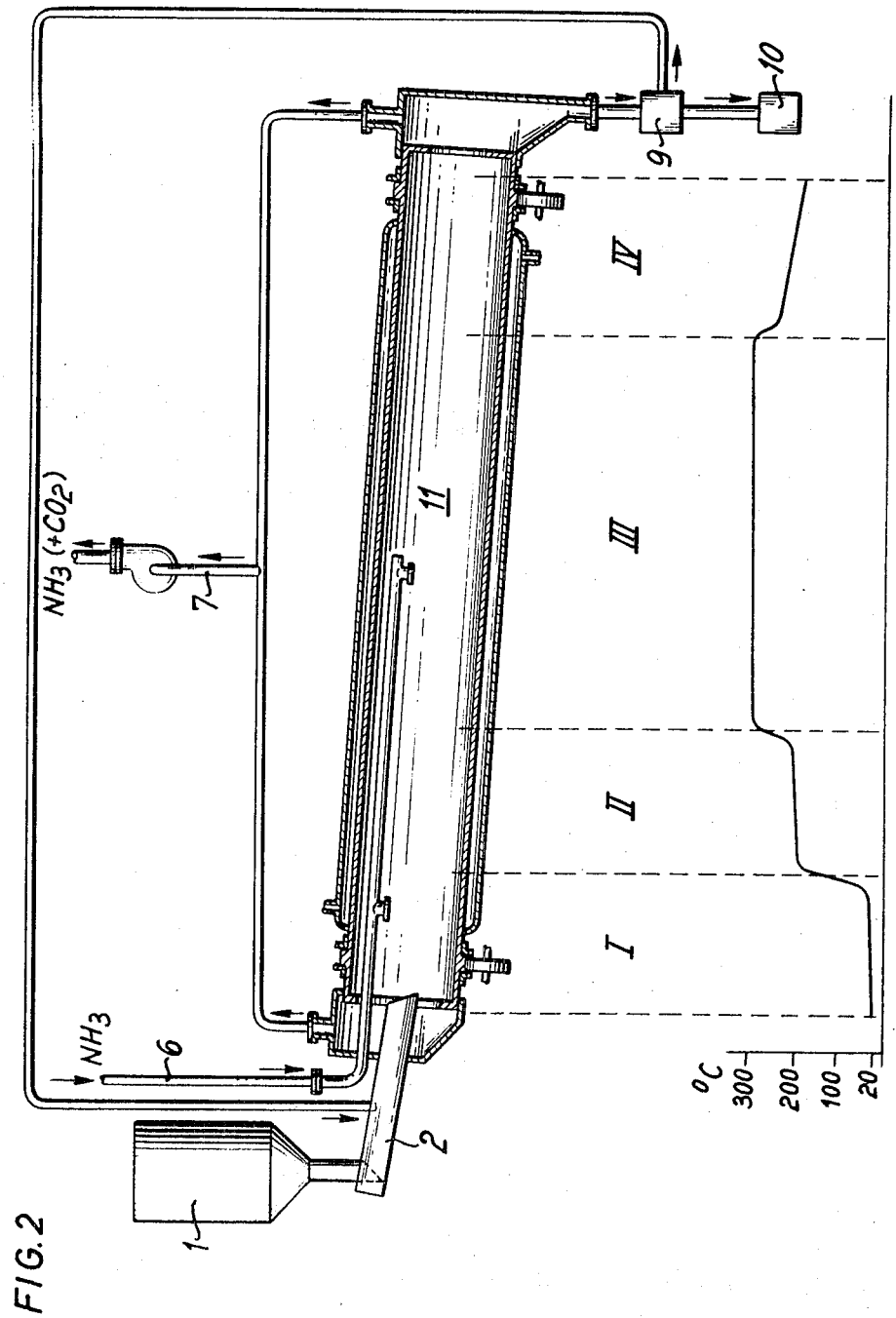

The production of APP by the present process in a rotary furnace can be effected in a manner similar to that described above. In this event, it is, however, advantageous to recycle a final product portion to the rotary furnace. The final product is partially returned so as to obviate the gradual formation of hard crusts in the rotary tube. It is normally sufficient to use the recycle material in a ratio of 1 : 1. A suitable apparatus is shown diagrammatically in FIG. 2 of the accompanying drawing. As shown therein, powder mixture coming from reservoir bunker 1 is fed together with recycle material to heated rotary tube 11, by means of conveyor 2. The temperature gradient in the rotary furnace is fairly consistent with that selected for the tunnel kiln shown in FIG. 1, and for this reason it should preferably be heated electrically (not shown in the drawing).

The ammonia needed for the reaction and maintaining the gas atmosphere is supplied through line 6 near the opening and center portions of the furnace, and ammonia in excess is suction-removed together with secondary air near the furnace ends, as shown in FIG. 1. No crusher is needed for the product which leaves the furnace in granular form. The rotary tube may partially be packed with large steel balls or similar material when finely granular product is desired to be produced. The product portion not returned, which is ground in mill 9, can directly be packed at 10.

The following Examples serve to further illustrate the process of the present invention.

EXAMPLE 1

A finely ground mixture of 10.64 kg. $P_4O_{10}$, 10.56 kg. $(NH_4)_2HPO_4$ und 0.3 kg. urea was placed, per hour, in a layer 16 mm. thick on a steel tape 150 mm. wide. The tape was conveyed at a speed of 20 cm./min. through a heated tunnel 6.5 m. long having a specific temperature gradient therein. 1.5 normal cubic meter (measured at N.T.P.) $NH_3$/hr. was fed to the tunnel approximately 0.5 m. downstream of its inlet opening, and 1 normal cubic meter/hr $NH_3$ was fed near the tunnel center portion. The two tunnel ends were extensively sealed. Ammonia which escaped therethrough was suction-removed together with secondary air. The temperature gradient in the tunnel was selected so as to be consistent with that shown in FIG. 1. This made it possible for the $P_4O_{10}$ in the loose mixture to absorb the $NH_3$ needed for the reaction, within the cold zone. A hard, porous and white APP-mass 22 mm. thick, which looked like a coherent board, was obtained near the end of the kiln. It could be crushed and ground in a hammer mill. The ground product contained $NH_3$ and P in a molar ratio of 0.99, had an average chain length $n = 400$, and contained 2 percent water-soluble component (10 percent suspension at 20° C.). The suspension had a pH-value of 5.9. The quantity of nitrogen bound as $NH_4^+$ was 99.5 weight percent, based on the total nitrogen content.

EXAMPLE 2

A mixture the same as that used in Example 1 was conveyed under identical conditions through the tunnel kiln save that a temperature of 225° C. was used in zone III. The product leaving the kiln had an appearance resembling that of the product obtained in Example 1, save that it was not quite as hard and brittle. The product contained $NH_3$ and P in a molar ratio of 1.0, had an average chain length $n = 22$, and contained 23 percent water soluble component (10 percent suspension at 20° C.). The suspension had a pH-value of 6.1. By heating it to 70 to 80° C., the product was completely dissolved with the resultant formation of a highly viscous solution. The quantity of nitrogen bound as $NH_4^+$ was 96.8 weight percent, based on the total nitrogen content.

EXAMPLE 3

A finely ground mixture which consisted of 7.95 kg. $P_4O_{10}$, 8.45 kg. $(NH_4)_2HPO_4$ and 0.48 kg. $CO(NH_2)_2$ and was used in combination with about 17 kg. ammonium polyphosphate (recycle material), was supplied per hour to a heatable rotary tube 4 m. long. Altogether 1.6 normal cubic meter/ammonia was fed to zones I and III, and the excess thereof was suction-removed near the ends of the rotary tube. The temperature gradient in the furnace corresponded to that shown in FIG. 2. The rotary tube was provided with an inside beating device to keep the inside wall free from incrustation. Pure, granular APP (maximum particle size = 10 mm.) left the rotary tube. It was subsequently ground. The product contained $NH_3$ and P in a molar ratio of 0.98, had a chain length $n = 110$, contained 3 percent water-soluble component, and had a pH-value of 5.7 (in a 10 percent suspension). The quantity of nitrogen bound as $NH_4^+$ was 99.0 weight percent, based on the total nitrogen content.

EXAMPLE 4

A finely ground mixture of 10.2 kg. $P_4O_{10}$ and 9.4 kg. $(NH_4)_2HPO_4$ was placed, per hour, in a layer 17 mm. thick on a steel tape the same as that used in Example 1. The tape was conveyed at a speed of 18 cm./min. through a tunnel kiln 6.5 m. long. The temperature gradient established therein corresponded to that shown in FIG. 1 with the exception that a temperature of 300° C. was maintained in zone III. 1.9 Normal cubic meter/hr. $NH_3$ was fed to the tunnel 0.5 m. downstream of its inlet opening, and 1 normal cubic meter/hr. $NH_3$ was fed near the tunnel center portion. The further conditions were consistent with those used in Example 1. The product leaving the kiln was a very hard, tightly sintered white mass. It was necessary to treat it in a crusher before grinding it. The product was analyzed and found to be APP which contained $NH_3$ and P in a molar ratio of 0.97, had an average chain length $n = 125$ and contained 4.5 percent water-soluble component. A 10 percent suspension thereof had a pH-value of 5.5. The quantity of nitrogen bound as $NH_4^+$ was 98.5 weight percent, based on the total nitrogen content.

We claim:

1. A process for continuously manufacturing ammonium polyphosphates of the formula $$(NH_4PO_3)_n$$

wherein n is the average chain length and a number between 10 and 400, said process comprising continuously passing a feed mixture of ammonium orthophosphate, phosphorus pentoxide and urea containing for each mol of ammonium orthophosphate $1 - x/2$ mol $P_4O_{10}$ and $x$ mol urea wherein $x$ is a number between 0.05 and 0.5 through an annealing zone in contact with gaseous ammonia at a temperature between about 200° and 340° C. and at a rate maintaining said feed material within said annealing zone for a period of time of from 10 to 60 minutes and recovering resulting ammonium polyphosphate of said formula.

2. The process of claim 1 wherein x is between 0.05 and 0.25

3. The process of claim 1 wherein the ammonia partial pressure is maintained at a value of at least 0.6 atmosphere for temperatures between 200° and 300° C. and at a value of at least 0.9 atmosphere for temperatures above 300° C.

4. The process of claim 1 wherein the feed mixture contains 0.06 mol urea per mol of ammonium orthophosphate.

5. The process of claim 1 wherein a portion of the recovered product is ground and recycled to the annealing zone.

6. The process of claim 5 wherein the feed material and recycled material are employed in a quantitative ratio of about 1:1 and the feed material contains between 0.1 and 0.15 mol urea per mol of ammonium orthophosphate.

7. The process of claim 1 wherein $x$ is smaller than 0.25 and said feed mixture is pretreated in an ammonia atmosphere at an elevated temperature below 190° C. for a period of time between 5 and 10 minutes.

8. The process of claim 7 wherein the ammonia partial pressure in said pretreatment is maintained at a value of at least 0.4 atmosphere.

* * * * *